United States Patent [19]

Buerger

[11] Patent Number: 4,991,789
[45] Date of Patent: Feb. 12, 1991

[54] RETRACTABLE CARPET SYSTEM FOR VEHICULAR QUARTERS

[76] Inventor: Michael H. Buerger, c/o Del-Met, 115 Hazel Path, Hendersonville, Tenn. 37075

[21] Appl. No.: 422,075

[22] Filed: Oct. 16, 1989

[51] Int. Cl.⁵ .................. B65H 75/40; B60J 11/00
[52] U.S. Cl. ..................... 242/86.52; 280/164.1; 296/156
[58] Field of Search ............ 242/86.52, 71.1, 86.5 R; 296/98, 143, 156, 162, 163; 280/163, 164.1, 164.2, 166, 169

[56] References Cited

U.S. PATENT DOCUMENTS

| | | | |
|---|---|---|---|
| 1,719,055 | 7/1929 | Herzer | 296/98 X |
| 2,724,395 | 11/1955 | Valentine | 296/98 |
| 2,796,456 | 3/1974 | Bergeson | 280/163 X |
| 3,488,066 | 1/1970 | Hansen | 280/163 |
| 3,595,497 | 7/1971 | Boatright | 242/99 |
| 3,938,753 | 2/1976 | Oshima | 242/156.1 X |
| 4,195,875 | 4/1980 | Venne | 296/163 X |
| 4,285,474 | 8/1981 | Perez | 242/156.1 X |

*Primary Examiner*—John M. Jillions
*Attorney, Agent, or Firm*—Natter & Natter

[57] ABSTRACT

A length or runner of carpet is provided for an entrance to vehicular quarters such as a recreational vehicle. The carpet is fixed to a spindle which is carried in a housing secured to the vehicle adjacent a vehicle entrance. When the vehicle is at a desired site, the carpet is unwound and laid out over the ground in front of the entrance. A hand crank is employed to rotate the spindle for rewinding the carpet. An electric or spring motor may be optionally used to rewind the carpet. When used in conjunction with vehicular quarters having a folding stair frame, the housing is mounted to stair support rails.

13 Claims, 2 Drawing Sheets

RETRACTABLE CARPET SYSTEM FOR VEHICULAR QUARTERS

BACKGROUND OF THE INVENTION

1. Field of the Invention

This invention relates generally to vehicular quarters and in particular, to an entranceway carpet arrangement.

2. Related History

Recent years have witnessed a resurgence in popularity of recreational vehicles such as motor coaches, motor homes and campers. Owners have taken particular pride in equipping their home away from home not only with the essentials of sleeping quarters but the basics and even some of the luxuries of permanent dwellings including kitchens, bathrooms, dining areas and household appliances.

Housekeeping chores associates with maintaining the cleanliness of one's home were often more difficult with respect to vehicular quarters due to the nature of use and ambient conditions at any particular site of the quarters. For example, occupants and guests often tracked in leaves, grass, twigs, sand, soil and other ground cover or debris. The relatively small size of vehicular quarters, as compared with permanent dwellings, served to increase the concentration of debris and soil carried into and deposited on the floor of the quarters.

If one employed a door mat at the entrance, there was a possibility that it would be left behind when the vehicle moved. Storage space inside the vehicle was required for the door mat and, since the door mat was stored inside, cleaning prior to storage and departure was required.

Applicant has appreciated the need for providing a carpet arrangement which could be readily set up at each site, stored without occupying interior vehicular space and would not only maintain interior cleanliness, but provide an air of luxury accommodations.

SUMMARY OF THE INVENTION

A carpet spindle to which is attached a length of carpet is carried in a housing and rotates between a pair of parallel end plates which extend from a cross member. A stringer plate or a cylindrical casing may be employed as the cross member. The housing may be mounted directly to the exterior of the vehicle or may be attached to the frame of a folding stair. To wind the carpet about the spindle, a crank arm is provided. In lieu of the crank arm, a spring or electric motor may be used.

From the foregoing compendium, it will be appreciated that it is an aspect of the present invention to provide a retractable carpet system of the general character described for vehicular quarters, which alleviates the conditions and disadvantages of the related history aforementioned.

A feature of the present invention is to provide a retractable carpet system of the general character described for vehicular quarters which reduces housekeeping chores.

A consideration of the present invention is to provide a retractable carpet system of the general character described for vehicular quarters which is readily available and simple to use.

It is a further consideration of the present invention to provide a retractable carpet system of the general character described for vehicular quarters which is suitable for economical mass production fabrication.

Another aspect of the present invention is to provide a retractable carpet system of the general character described for vehicular quarters which promotes an air of luxury while being relatively low in cost.

A still further aspect of the present invention is to provide a retractable carpet system of the general character described for vehicular quarters which does not utilize otherwise available interior storage space.

Other aspects, features and considerations of the present invention in part will be obvious and in part will be pointed out hereinafter.

The invention accordingly comprises the features of construction, combinations of elements, arrangements of parts and series of steps by which the aspects, features and considerations aforementioned and certain other aspects, features and considerations are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

Figure 1:
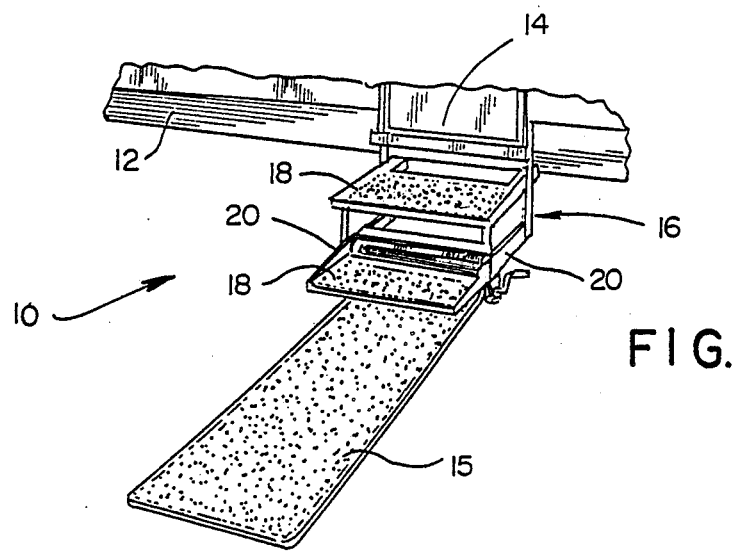
FIG. 1 is a perspective illustration of a retractable carpet system constructed in accordance with and embodying the invention and showing such system mounted to the frame of a folding stair which is secured to a motor home.

Referring now in detail to the drawings wherein like numerals have been employed to denote like components, the reference numeral 10 denotes generally a retractable carpet system constructed in accordance with and embodying the invention. The carpet system 10 provides a ground cover comprising a length or runner of carpet 15 associated with vehicular quarters such as a motor coach 12. The carpet system 10 may be employed in association with other moveable quarters such as campers, construction trailers and the like.

In accordance with the invention, the carpet system 10 is mounted, in conjunction with the motor coach 12, to be deployed in front of an entranceway or entrance door 14 and may, for such purpose, be conveniently mounted to a conventional foldable stair frame 16. The stair frame 16 includes a pair of steps 18 with the lowermost step having side support rails 20 which extend rearwardly into the frame 16.

The carpet system 10 is alternately well suited for mounting directly to any portion of the underside of a vehicle or to a side panel of a vehicle beneath or adjacent an entranceway.

Figure 2:
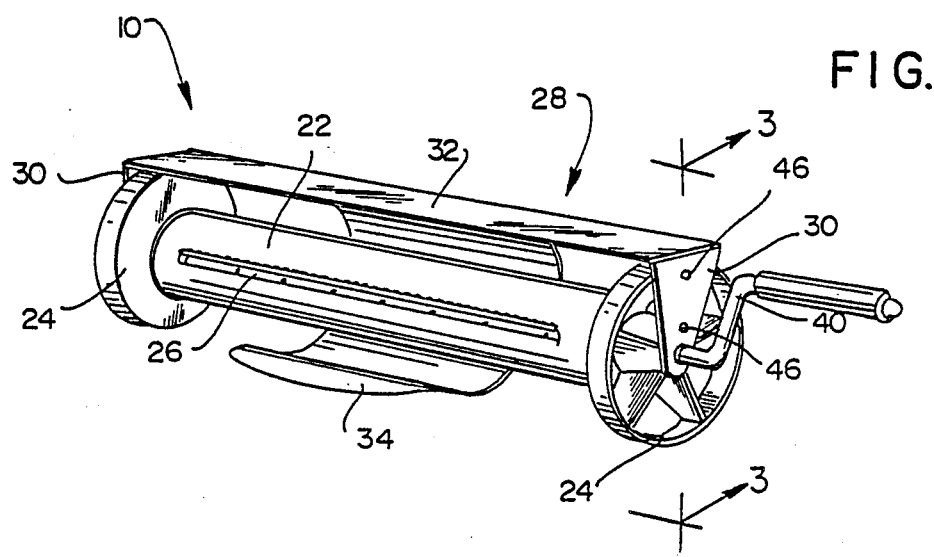
FIG. 2 is an enlarged scale perspective view of the retractable carpet system, with the carpet removed and showing a carpet spindle carried in a housing between a pair of end plates.

From an examination of FIG. 2 which illustrates the retractable carpet system with the carpet 15 removed for the purpose of more clearly depicting the components, it will be seen that the carpet system 10 includes a spindle 22 having a pair of end rims 24 and between which the length of carpet 15 is coiled. A carpet gripping clamp 26 is secured to the spindle 22 with a plurality of adjustable fasteners, such as screws, to permit the removal and replacement of the carpet 15.

The spindle 22 is carried in a mounting bracket 28 which includes a pair of parallel end plates 30 and a cross member comprising a horizontal stringer plate 32. In order to assure tight rewinding of the carpet and prevent inadvertent unwinding, a generally C-shaped leaf spring 34 is secured to the underside of the stringer plate 32.

Figure 3:
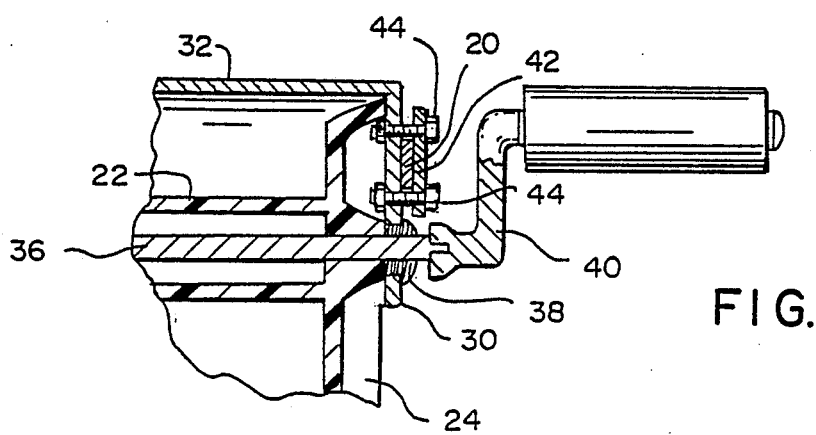
FIG. 3 is a fragmentary enlarged scale sectional view through the carpet system the same being taken substantially along the plane 3—3 of FIG. 2 and with the housing shown mounted to a step support rail of the stair frame.

With reference now to FIG. 3, it will be observed that the spindle 22 is mounted for rotation between the end plates 30 through a journal rod 36 which is fixed to the spindle. The ends of the journal rod 36 extend through a bushing 38 which is positioned within a suitable aperture in each end plate 30. One end of the journal rod 36 is suitably keyed for engagement with a crank arm 40. The crank arm is employed for rewinding the carpet 15 about the spindle 22.

Also illustrated in FIG. 3 is a clamp plate 42 which serves to mount the carpet system mounting bracket 28 to the stair frame 16 by clamping the step side support rails 20 against the end plates 30. Suitable apertures 46 are provided in the end plates 30 for a pair of bolts 42 which extend through mating apertures in the clamp plate 42.

Figure 4:
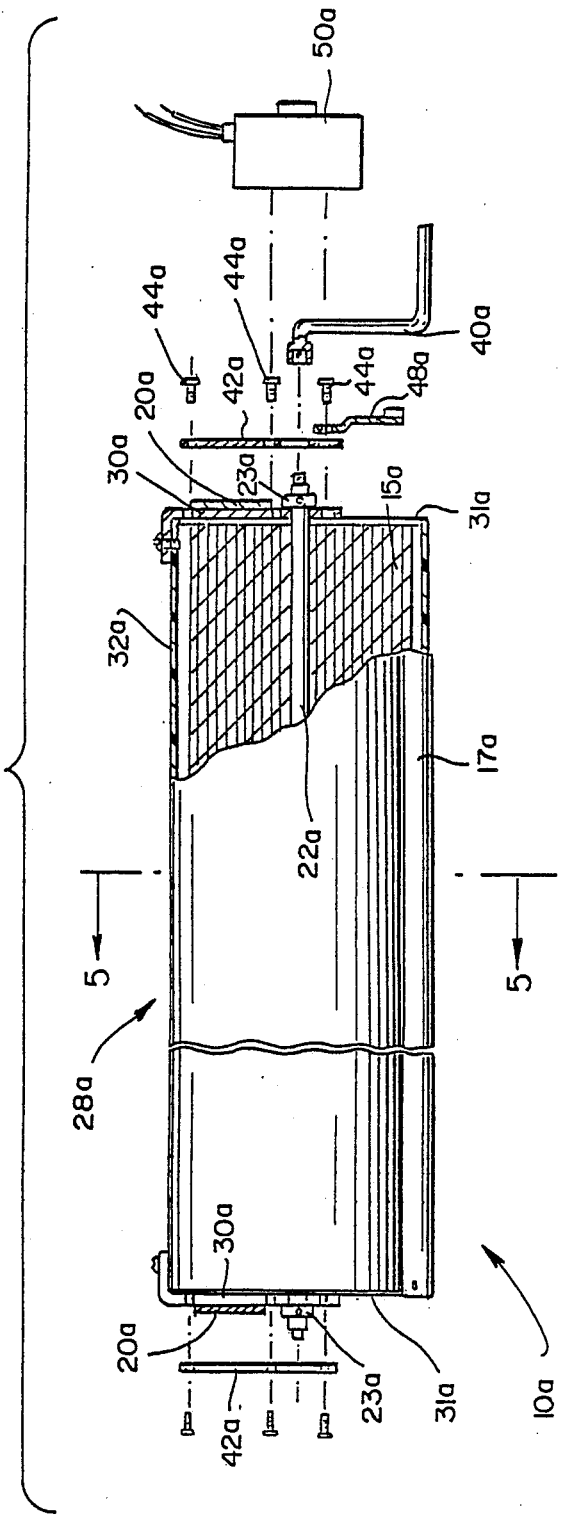
FIG. 4 is an exploded fragmentary plan view of an alternate embodiment of the retractable carpet system wherein the housing includes a cylindrical casing and further showing an optional motor which may be utilized to rotate the spindle.
Figure 5:
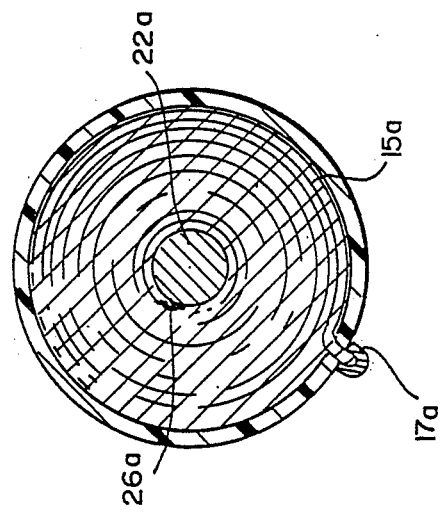
FIG. 5 is an enlarged scale sectional view through the retractable carpet system, the same being taken substantially along the line 5—5 of FIG. 4.

Referring now to FIG. 4 wherein an alternate embodiment of the invention is shown, like numerals will be employed to denote components corresponding to those described with respect to the prior embodiment, however, bearing the suffix "a". In this embodiment, a retractable carpet system 10a includes a spindle 22a about which is wound a length of carpet 15a having its free end bound by a molding strip 17a. The opposite end of the carpet 15a is secured to the spindle 22a by a clamp 26a identical in construction to that described with respect to the prior embodiment.

In accordance with the invention, a housing 28a includes a pair of end plates 30a which are secured to a cylindrical casing 32a in any conventional manner, such as by fasteners which extend from a portion of the end plates 30a which overly the cylindrical casing 32a. In addition, the housing 28a may include end covers or caps 31a which completely cover the ends of the cylindrical casing to preclude soiling of the coiled carpet 15a. Alternately, the end plates 30a may extend downwardly and completely cover the ends of the cylindrical casing and the end cap 31a need not be used.

As with the prior embodiment, the spindle 22a includes journal portions projecting axially adjacent its ends. Such journal portions are received in an aperture formed in each of the end plates 30a. A locking collar 23a may be provided to prevent axial movement of the spindle 22a. An end of the spindle 22a is suitably keyed for receiving a crank arm 40a.

As with the prior embodiment, the carpet system 10a can be mounted between a pair of stair frame step support rails 20a by utilizing suitable clamp plates 42a and suitable fasteners such as bolts 44a. It should be noted, however, that in the embodiment of FIG. 4, the clamp plates 42a extend beneath the journal portions of the spindle 22a and include an aperture to accommodate the spindle 22a.

Also illustrated in FIG. 4 is a handle retaining spring 48a which engages the crank arm 40a to prevent undesired rotation of the crank arm. The embodiment of FIG. 4 also includes an optional motor 50a which may be utilized to rewind the carpet 15a about the spindle 22a in lieu of the crank arm 40a. The motor 50a may comprise a suitable 12 volt electric motor and appropriate reduction gearing to provide the necessary torque for rewinding the carpet. Alternately, the motor 50a may comprise a coil spring motor to rewind the carpet 15a about the spindle 22a.

Differently dimensioned housings can be provided for different sized stair frames or a single size housing may be used with shims or adjustable brackets.

It should also be appreciated that the retractable carpet system of the present invention is well suited for employment in conjunction with any type of movable quarters and including, for example, boats wherein it could be utilized to provide a carpet for covering a dock.

Thus it will be seen that there is provided a retractable carpet system which achieves the various aspects, features and considerations of the present invention and which is well suited to meet the conditions of practical usage.

As various changes might be made in the retractable carpet system as above set forth, it is to be understood that all matter herein described as shown in the accompanying drawings is to be interpreted as illustrative and not in a limiting sense.

Having thus described the invention there is claimed as new and desired to be secured by Letters Patent:

1. A retractable carpet system for movable quarters, the carpet system comprising a carpet runner, a mounting bracket, means for attaching the bracket to the quarters beneath an entranceway of the quarters, the bracket including an elongated, generally planar stringer plate, the stringer plate having a length greater than the width of the carpet runner, the mounting bracket further including a pair of parallel end plates extending from opposite ends of the stringer plate, the carpet system further including a spindle rotatably mounted between the end plates about an axis parallel to the plane of the stringer plate, means for securing an end of the carpet runner to the spindle, means for rotating the spindle to wind the carpet runner about the spindle and means for assuring that the carpet runner is tightly wound about the spindle when not in use and for preventing inadvertent unwinding of the carpet runner, the means for assuring and preventing including a one piece spring and means mounting the spring to the bracket, the spring having a normal profile transverse to the axis of the spindle which includes at least a portion of the spring spaced from the axis a distance less than the radial distance of the outer periphery of the carpet runner when wound about the spindle, the portion of the spring being biased against and engaging the outer periphery of the carpet runner when being rewound.

2. A retractable carpet system for movable quarters as constructed in accordance with claim 1, the quarters including a foldable stair frame mounted beneath the entranceway, the system further including means for attaching the mounting bracket to the frame.

3. A retractable carpet system for movable quarters as constructed in accordance with claim 2, the stair frame including parallel side support rails, the stringer plate having a length less than the distance between the rails, the means for attaching the mounting bracket to the frame including means for attaching the end plates to the rails.

4. A retractable carpet system for movable quarters as constructed in accordance with claim 1 wherein the means for rotating the spindle includes means providing a key at an end of the spindle and torque applying means, the torque applying means being in engagement with the key.

5. A retractable carpet system for movable quarters as constructed in accordance with claim 4 wherein the torque applying means comprises a removable crank arm.

6. A retractable carpet system for movable quarters as constructed in accordance with claim 4 wherein the torque applying means comprises an electric motor and a reduction gearing.

7. A retractable carpet system for movable quarters as constructed in accordance with claim 4 wherein the torque applying means comprises a coil spring motor.

8. A retractable carpet system for movable quarters as constructed in accordance with claim 1 wherein the spring is configured with an arcuate profile transverse to the spindle axis.

9. A retractable carpet system for movable quarters as constructed in accordance with claim 8 wherein the spring is configured with substantially continuously decreasing radial distance toward the spindle in transverse axial profile.

10. A retractable carpet system for movable quarters as constructed in accordance with claim 1 wherein the spring is a leaf spring.

11. A retractable carpet system for movable quarters as constructed in accordance with claim 1 wherein the spring is mounted to the stringer plate.

12. A retractable carpet system for movable quarters as constructed in accordance with claim 1 wherein the means for securing an end of the carpet runner to the spindle comprises a carpet gripping clamp and means for removably fastening the clamp to the spindle whereby the carpet runner may be easily replaced.

13. A retractable carpet system for movable quarters, the carpet system comprising a carpet runner, a mounting bracket, means for attaching the bracket to the quarters beneath an entranceway of the quarters, the bracket including an elongate, generally planar stringer plate, the stringer plate having a length greater than the width of the carpet runner, the bracket further including a pair of end plates extending from opposite ends of the stringer plate, the carpet system further including a spindle rotatably mounted between the end plates about an axis parallel to the plane of the stringer plate, means for securing an end of the carpet runner to the spindle, means for rotating the spindle to wind the carpet runner about the spindle, the movable quarters including a foldable stair frame mounted beneath the entranceway, the stair frame including parallel side support rails, the stringer plate having a length less than the distance between the rails, the means for attaching the bracket to the quarters including means for attaching the end plates to the rails.

* * * * *